United States Patent [19]

Dobbins

[11] Patent Number: 4,847,589
[45] Date of Patent: Jul. 11, 1989

[54] VISUAL AND AUDITORY SIGNALING SYSTEM

[76] Inventor: Hugh L. Dobbins, 8050 Lester Rd., Fairburn, Ga. 30213

[21] Appl. No.: 224,168

[22] Filed: Jul. 26, 1988

[51] Int. Cl.⁴ .......................... G08B 27/00; B60Q 7/00
[52] U.S. Cl. ..................................... 340/326; 340/321; 340/908; 340/471; 340/473; 340/474; 340/436; 340/464
[58] Field of Search ...................... 340/326, 321, 52 H, 340/331, 908, 84, 87, 88, 83, 90, 94, 81 R, 815.02, 815.15, 815.16, 815.21, 815.22; 116/63 P

[56] References Cited

U.S. PATENT DOCUMENTS

| | | | |
|---|---|---|---|
| 3,493,924 | 2/1970 | Dobbins | 340/321 |
| 3,562,705 | 2/1971 | Paris | 380/321 |
| 3,629,821 | 12/1971 | Dobbins | 340/81 R |
| 4,447,802 | 5/1984 | Böse | 340/84 |
| 4,559,517 | 12/1985 | Rahn | 340/326 |

*Primary Examiner*—Donnie L. Crosland
*Attorney, Agent, or Firm*—Technical Patent Institute

[57] ABSTRACT

An emergency signal sending apparatus for emitting a preset sequence of visual and auditory signals. The apparatus can be manually or automatically switched so as to indicate the nature of assistance required by the signal sender. The signal sending apparatus can be equipped with a sudden or rollover motion sensing automatic switching device so that the preset signalling sequences will be initiated regardless of operator input. The signal sending apparatus includes an auditory signalling unit so that signalling can be successfully accomplished even if the sending apparatus is obscured from view.

13 Claims, 3 Drawing Sheets

VISUAL AND AUDITORY SIGNALING SYSTEM

FIELD OF THE INVENTION

The present invention relates to the field of visual and auditory signalling systems whereby preset signalling sequences can be initiated either manually or automatically. More particularly, the present invention relates to an emergency signalling system which includes a manually actuated red, amber, and green light signalling system and an optional automatically actuated red light and auditory signalling system.

BACKGROUND OF THE INVENTION

It has been the unfortunate province of the stranded or endangered individual to have no system whereby communication could be conducted between the stranded or endangered individual and passing individuals. For instance, in the field of motor vehicles, help is only rendered when a passing vehicle stops and inquires if assistance can be given. However, it may not always be convenient for a passing motorist to stop for safety and other reasons. Similarly, in circumstances where an individual may believe their life is in danger, either from an immediate risk, i.e., personal attack, or imminent risk, i.e., onset of an asthma attack, there are no devices or systems which provide for convenient portable emergency communications.

In order to alleviate this unfortunate lack of communicating capacity in the automotive field, it has been proposed in U.S. Pat. Nos. 3,629,821 and 3,493,924, that a visual motorist aid device be provided whereby passing vehicles could effectively communicate with the stranded motorist.

While the prior art has attempted to solve this communication problem, the solutions posed have been less than optimal. Firstly, the solution posed in U.S. Pat. No. 3,629,821 lacks any means for communicating the nature of the help needed by the individual. For instance, in the circumstance where an individual requires medical assistance, the prior art communication system offered no method of signaling this particular and possibly critical need. Rather, the passing individual could only presume the nature of the assistance needed and stop at the nearest auto servicing or police center to send help to the stranded individual. If the stranded individual required medical help, and there existed some criticality to that need, a shortly arriving tow truck or other service vehicle would be of little help.

The solution posed in the earlier prior art patent, U.S. Pat. No. 3,493,924, offered similar results to the improvement patent previously discussed. The earlier reference did, however, provide an automatic actuation system whereby an impact sensing mechanism would actuate the signalling lights in the event that the automobile operators and passengers of a vehicle equipped with the aid device were unable to manually trigger the signalling system. Similarly, however, the automatic signalling system lacked any provision for indicating the nature of the assistance needed. Rather, the signalling lights would be illuminated which would only indicate a general need for help, again leaving a potential help sender to either speculate about the nature of the help required, or only send mechanical aid.

The prior art systems also lack any provision whereby an unseen vehicle or person requiring assistance could be located by a passing motorist or highway patrolman by other than a visual signalling system. Although the '924 patent discloses that a passing motorist could indicate acknowledgement of having received a distress signal by giving short blasts on the vehicle horn, such an audible signal does little if the passing motorist has not received a distress signal to acknowledge.

Thus, an additional drawback in the prior art is that should a vehicle or person equipped with one of the prior aid devices leave the road or path and be unseen by passing individuals, regardless of the manual or automatic visual signalling taking place, no help of any kind would be sent because passing individuals or patrolmen would remain uninformed as to the need for help.

SUMMARY OF THE INVENTION

The present invention discloses an improved version of the prior art Motorist Aid devices discussed above. The present invention proposes much improved portability and the inclusion of two additional features with respect to the prior art devices. Firstly, a communication aid device according to the present invention includes a red dome light which can be activated in one of two sequences so as to indicate the need for medical help or the capacity of the stranded individual to otherwise communicate. That is, the red dome light can be activated so as to flash in combination with any other sequence of distress signals so as to indicate the need for medical assistance. Or, the dome light can be lit with a steady current so as to indicate that the stranded individual is equipped with other communication systems, such as, C.B. radio, modular telephone, etc.

An aid device according to the present invention can also include an impact or rollover sensing device which activates upon non-desirable motion being imparted to the device itself or the vehicle (boat, motorcycle, etc.) in which the device is mounted. For instance, if a vehicle equipped with an aid device according to the present invention leaves the roadway and is obscured from the view of passing vehicles, the impact or rollover sensing device activates the emergency light signalling system as well as an audible emergency signalling system. Similarly, if an individual wearer of an aid device should fall, be attacked, or otherwise abruptly accelerate the device, automatic signalling will be initiated. In either circumstance, the signalling system provides a pulsing sound and light signal so as to alert passing individuals to the need for help and to preserve the battery from the drain of uninterrupted actuation.

Other objects, features, and characteristics of the present invention, as well as methods of manufacture and functions of the related elements, will become apparent upon consideration of the following description and the appended claims, all of which form a part of this specification.

DETAILED DESCRIPTION OF THE PREFERRED EMBODIMENT

Figure 1:
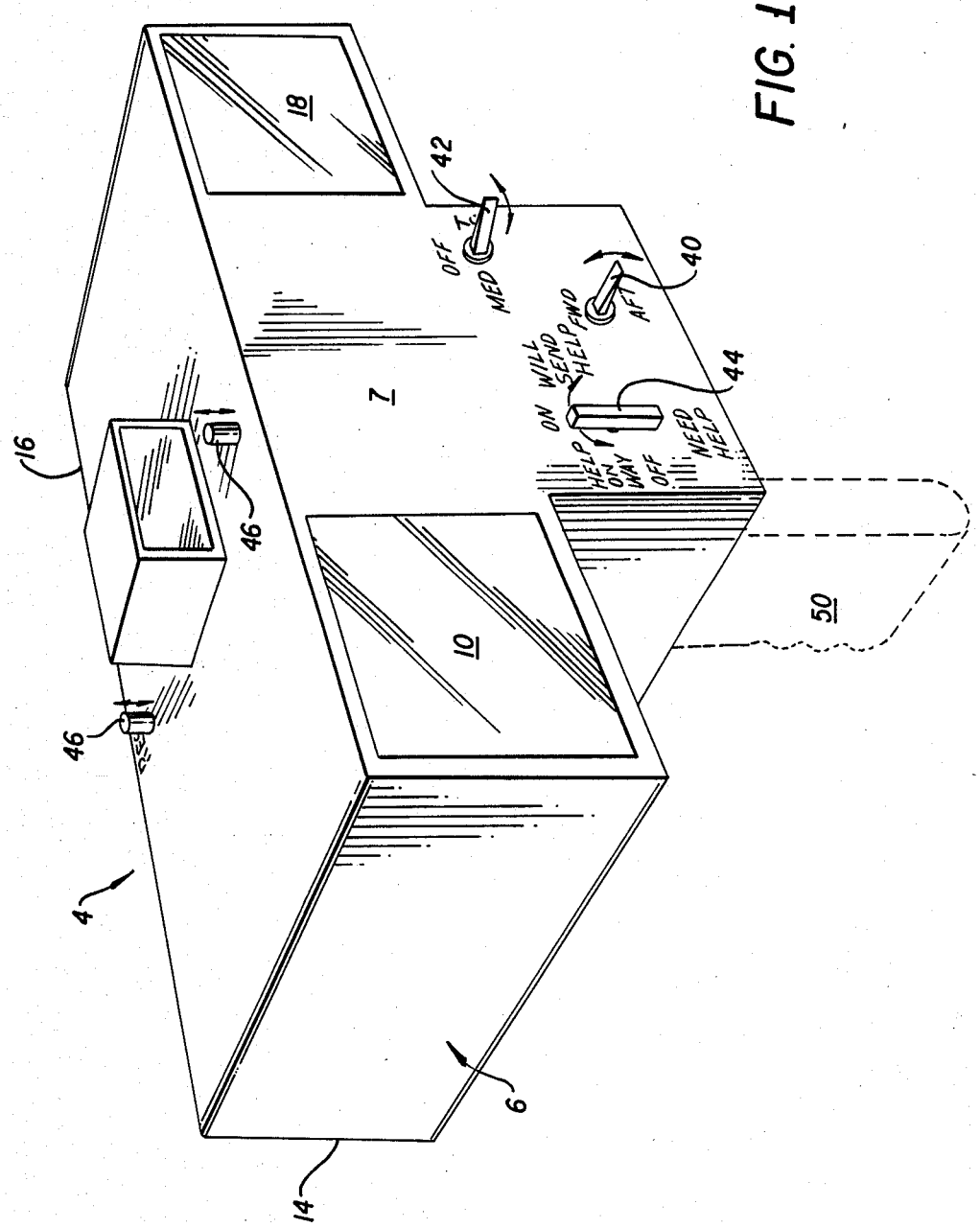
FIG. 1 is a perspective view of a visual aid device according to the present invention.

An aid device according to the present invention is shown in a moderately portable configuration in FIG. 1. This embodiment 4 can be either conveniently attached to a vehicle body (ie, top of dash board or rear deck) or can optionally be equipped with a handle 50 and internal batteries for remote and vehicle independent operation. The apparatus in this embodiment is comprised of light weight components, such as thin gauge metal sheeting and accessories, and weighs little more than one and one-half pounds. As such, the apparatus lends itself to convenient transfer from vehicle to vehicle or self-sufficient remote operation (i.e., hikers, bikers).

Figure 3:
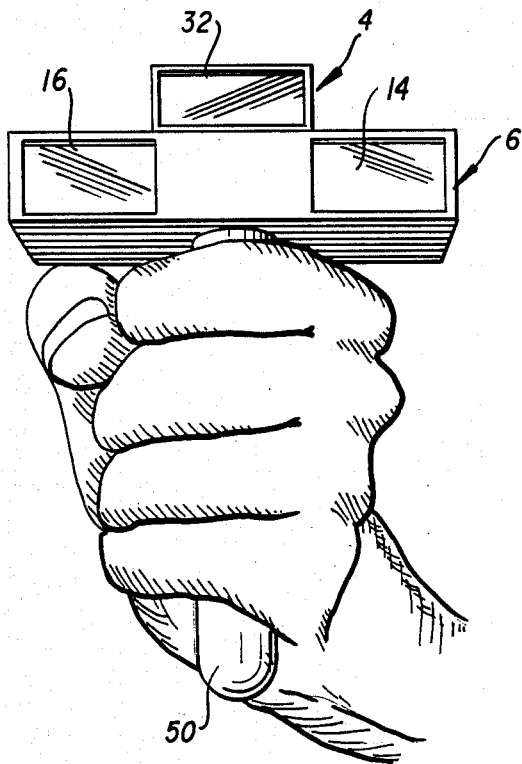
FIG. 3 is a perspective view of an alternate personally portable embodiment of an aid device according to the present invention.

A rather more portable aid device (ie. smaller, lighter, and more compact) is shown in FIG. 3. This embodiment includes substantially all of the internal componentry of the larger devices with the possible exception of rearwardly directed lenses (discussed below). In this manner, an operator can effectively aim the visually emitted portions of the signalling sequence in the most result promising direction. The embodiment shown in FIG. 3 is also intended for self sufficient, i.e., battery operated, use.

Figure 4:
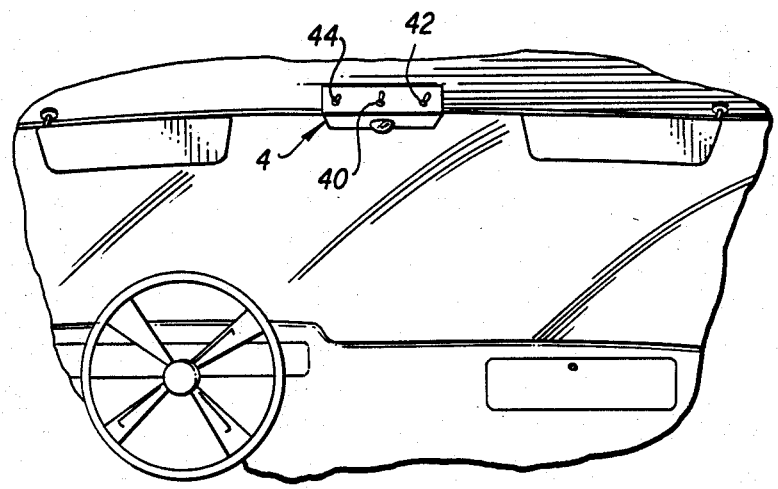
FIG. 4 is a perspective view of a preferred mounting position for the control panel of a vehicle mounted aid device according to the present invention.

A signalling system according to the present invention may also be incorporated into a vehicle itself. In this manner, the signalling system control panel can be positioned remotely (see FIG. 4) from the signalling lights and can thereby be made readily accessible in much the same way as conventional radio or air conditioning controls. The respective lights and optional audible signalling unit associated with the motorist aid can be mounted strategically in satellite positions throughout the vehicle so as to lend themselves to the greatest visibility or audibility with respect to passing vehicles.

An embodiment of a motorist aid device according to the present invention is shown in FIG. 1 and includes an outer casing portion 6. The outer casing portion 6 completely envelopes all of the hardware associated with the aid device and includes forward and aft panels thereon. The aft panel 7 includes the control panel on a lower portion thereof for access by a seated operator within a vehicle when the device is dash mounted. The control panel is equipped with rotary switch 44 for controlling the desired setting of the device for manual or automatic actuation and for selecting the desired sequence of signalling for the amber and green signalling lights. The control panel is also equipped with toggle switches 40 and 42 for controlling the fore and aft green and amber signalling, and red dome light actuation respectively.

Toggle switch 40 controls the signalling of the aid device with respect to whether visual signals are transmitted from the forward or aft green and amber lenses. FIG. 1 depicts the aft side of the aid device which is equipped with rear amber lens 10 and rear green lens 18. The side of the aid device opposite the aft side shown in FIG. 1 is characterized as the forward side, and includes the forward amber lens 14 and the forward green lens 16.

The upper side of the aid device includes red dome light 32 and, if the device is equipped with impact sensing apparatus, the impact sensing apparatus reset buttons 46. The red dome light is desirable visible both forwardly and rearwardly and can be made up of a single housing with lenses facing forwardlly and rearwardly with respect to the orientation of the aid device 4.

In this particular portable embodiment, shown equipped with the impact sensor, the reset buttons for the impact sensing device are positioned within the top outer surface of the motorist aid device. As will be explained in a later portion of this specification, the reset buttons 46 operate so as to reset the impact sensing device incorporated within the aid device in the event of unintended or inadvertent actuation. The operation of the respective reset, rotary, and other switches will be explained in relation to the circuit diagram shown in FIG. 2.

Figure 2:
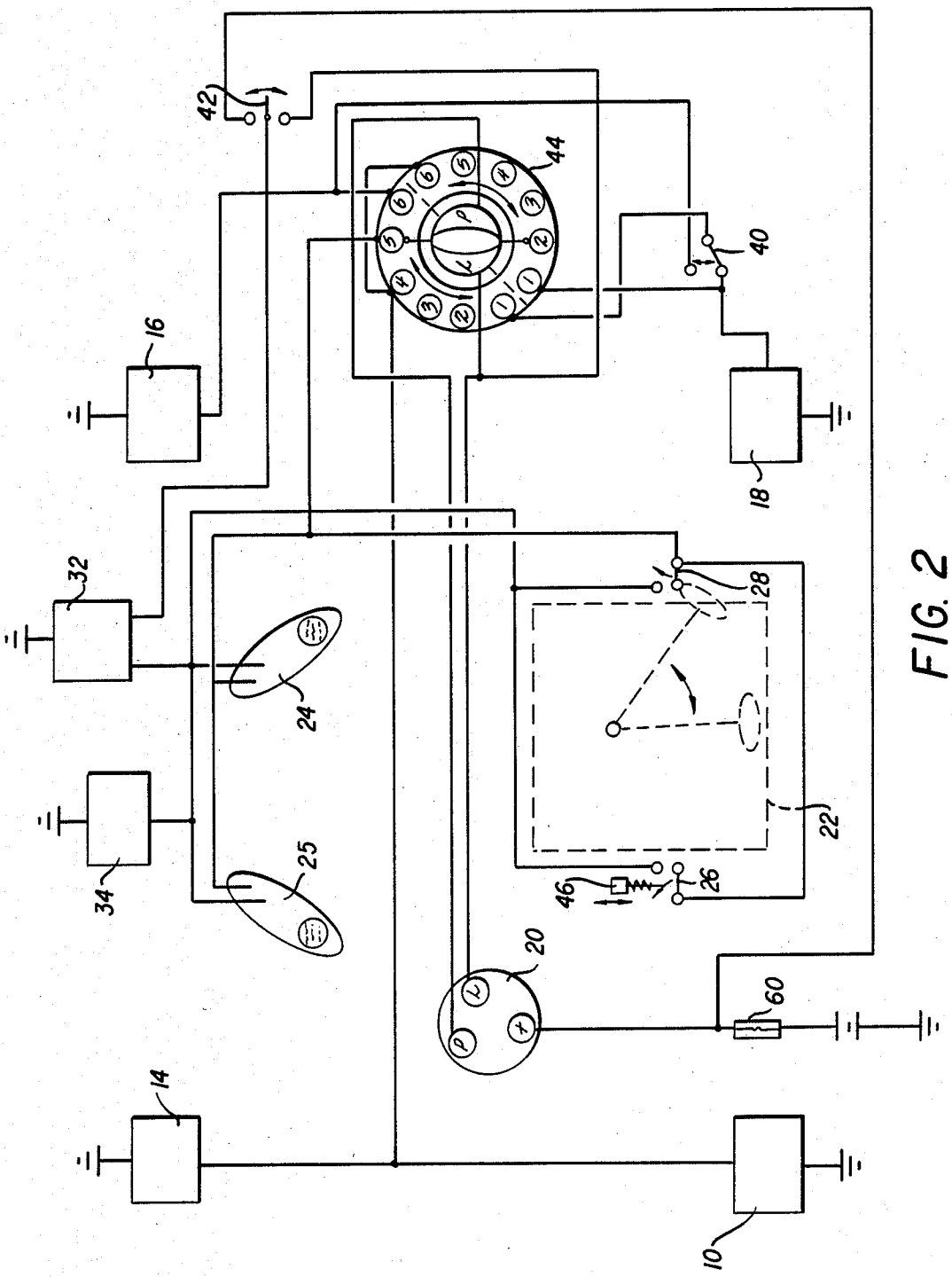
FIG. 2 is a schematic circuit diagram of an aid device according to the present invention.

FIG. 2 illustrates an example circuit diagram for an aid device according to the present invention. The apparatus circuitry is generally designated 5 and includes the switches from the control panel on the aft side 7 of the device 4. These switches are labeled with the same designations as used in FIG. 1 and include rotary switch 44 and toggle switches 40 and 42. In this embodiment, rotary switch 44 may comprise any rotary switch having at least six positions so as to activate the respective signal sending units in the desired sequence. In the embodiment shown, the rotary switch is a two pole (L/P) six position switch.

The rotary switch 44 is connected to a source of electrical potential through alternating flasher 20. The flasher unit 20 may comprise any alternating three pole flasher of appropriate capacity to handle the expected current draw from the signal sending systems. The present invention contemplates a variety of applications for which the motorist aid would be useful and which applications would have widely varying power requirements. For instance, an emergency vehicle or pleasure boat equipped with an aid device would likely have many more lights (i.e. emergency and/or navigation) requiring activation than would a motorcycle or hiker similarly equipped. As such, although only a single embodiment of the present invention is explicitly disclosed with respect to the requisite specifications of the various elements and circuitry, it is intended that one of ordinary skill in the electronics art would readily size and design an aid device for a variety of particular needs (i.e. solar activated, carried on an individual's person, in pocket, on wrist, in the home, etc.).

A suitable flasher 20 for a 12 V system is any alternating flasher used in the automotive industry. The flasher supplies alternating pulses of current to the L and P sides of the bipolar rotary switch 44. Switch 44 is in turn separately connected each of the signal sending lights 14, 10, 16, 18, double filament dome light 32, and horn 34. (For greater illumination, all of the visual signal sending units may optionally be double filament bulbs, halogen bulbs, xenon gas filled, etc.).

In the illustrated impact and rollover sensing equipped embodiment, rotary switch 44 is also connected to the mercury rollover switches, 24 and 25, and impact toggle switches, 26 and 28, which are actuated by the impact sensing device 22.

The requisite connections of the rotary switch 44 to the separate elements of the motorist aid device can be explained by a description of their respective functions during the operation of the motorist aid device.

When the rotary switch is in the left most position, the desired function is to signal that the operator "NEEDS HELP". The signal contemplated to indicate "NEED HELP" is alternately flashing amber and green. To accomplish this signal sequence, the rotary switch is set to the "NEED HELP" position indicated in FIG. 1 which corresponds to 1L in FIG. 2. The rotary switch 44 will then connect the respective forward and aft amber and one of the green lights to the respective L and P sides of the rotary switch. Since the alternating L and P poles of flasher unit 20 are connected to the respective L and P sides of the rotary switch, the forward and aft amber lights will flash in alternating sequence with the selected one of the forward and aft green lights. An operator can select which of the green lights (forward or rearward) that should be operated by switching toggle switch 40 to the selected forward or aft position. In this manner, an operator can selectively signal in a selected direction or can signal in two directions by alternately switching toggle switch 40 back and forth between the fore and aft positions.

If an operator requires medical assistance, the operator can merely switch toggle switch 42 to the "MED" position. In this way, one of the filaments of the double filament red dome light 32 is connected in series with the alternately flashing amber and green lights so that the dome light flashes to indicate medical help is required. In this embodiment, the dome light flashes in parallel with the green light.

Proceeding to the right around the rotary dial, the next two positions, 2L and 3L, are power off positions. These two positions are provided so that the device can be completely deactivated in the event of a malfunction or in the event that the optional impact/rollover device has inadvertently activated and an operator has not had the opportunity to press either of the reset buttons 46 (explained in greater detail below) to disengage toggle switches 26 and 28.

Position 4L corresponds to the "HELP ON WAY" position shown in FIG. 1. In this position, the forward and aft amber lights are activated in flashing unison. Again, one of the filaments of red dome light 32 may be activated to indicate that medical help is on the way by switching toggle switch 42 to the "MED" position. In this manner, a stranded individual may indicate that medical help is on the way and, at the same time, inform passing individuals that the distress call is being answered.

The next position of the rotary switch is the optional roll over and impact sensing automatic actuation position. In this position, 5L in FIG. 2 and "ON" in FIG. 1, one of the filaments of the double filament red dome light and the audible signal sending unit 34 (auto horn or other sound producing device) are triggered for automatic pulsing actuation by any one of mercury switches 24, 25, or impact toggle switches 26, 28. If the aid device is rolled sufficiently out of level while the rotary switch is in position 5L, either of the mercury switches will complete the circuit to the dome light and sound unit 34. In this way, for example, if a vehicle (i.e. car, boat, motorcycle) equipped with a motorist aid roll onto one side or become completely inverted, emergency signally is automatically actuated without further input from an operator.

Similarly, if a vehicle equipped with a motorist aid experiences an impact, or, in the case where the device is worn, an individual falls or is violently struck, the impact sensing device 22 (illustrated as a pendulum in combination with toggle switches 26 and 28) will complete the circuit to one of the filaments of red dome light 32 and sound unit 34. Again, emergency signalling is actuated without further input from an operator. Additionally, since the red light is activated in both the roll over and impact situations, the nature of the emergency help required is immediately known (ie. medical help).

In the illustrated embodiment of the aid device, the impact sensing mechanism 22 is shown as a combination pendulum and toggle switch actuated apparatus. The pendulum is pivotally mounted for fore and aft movement with respect to the vehicle in which the aid device is placed. In the portable embodiment shown, the pendulum is mounted within the casing 6 so as to pivot fore and aft just beneath the double filament red dome light 32. The toggle switches 26 and 28 are mounted on the inner surfaces of the fore and aft panels of casing 6 so as to interrupt the travel of the pendulum upon impact. In this embodiment, the toggle switches are actuated upwardly within the casing 6. As such, reset buttons 46 are positioned immediately above each of the toggle switches 26 and 28 so that the reset buttons can simply be depressed and thereby deactivate the sound unit 34 and red dome light 32.

While the present impact apparatus 22 discloses the use of a pendulum and toggle switches, it is contemplated that any type of impact sensing device capable of being reset can be used. For example, a clip held mercury switch can be used wherein the mercury switch is dislodged from the clip when the clip is struck by a pendulum. In this manner, the mercury switch activates the automatic signalling system until the switch is reset into the associated retaining clip. Similarly, a ball and socket type impact sensor of the type used in the prior art U.S. Pat. No. 3,493,924 may also be used. If the ball becomes unseated inadvertently, an operator can merely release the tension on the ball retaining socket sufficiently to enable the ball to reseat and separate the contacting actuation surfaces.

As illustrated by the above examples of impact sensing devices, a variety of these types of devices exist and, with the advent of additional passive safety devices (air bags, automatic tensioning seat belts, etc.) in automobiles, boats, planes, etc. requiring automatic actuation, many more kinds of these devices are expected to be created. Hence, while a pendulum and toggle switch type of impact sensing device has been illustrated, it is not intended that the present invention be limited to such a configuration.

The next position for rotary switch 44 is position 6L. This position corresponds to the "WILL SEND HELP" position shown in FIG. 1. With the rotary switch in this position, a passing individual equipped with a similar aid device can signal that help will be sent by that person. Since the passing individual will desirably signal that help will be sent from both the approaching and departing vantage points of the stranded individual, the rotary switch 44 connects the forward and aft green lights to the respective L and P sides of the switch so that the green lights alternately flash. Again, toggle switch 42 may be switched to the "MED" position so that the passing individual can indicate their understanding that medical help is required.

In all of the above "NEED HELP", "WILL SEND HELP", and "HELP ON WAY" signalling sequences, for both the impact/rollover equipped and non-equipped aid devices, the flashing amber and green lights can be accompanied by either a flashing or steady red light. As previously disclosed, toggle switch 42 can be switched to the "MED" position so as to indicate that medical help is required (or being sent in the case of a passing individual's acknowledgement). In this position, a first filament of the red dome light is connected in series with the flasher and gives a pulsating red signal.

Switch 42 can also be switched to the "TEL., C.B., VICOM." position and thereby connect the first filament (the second filament being reserved for automatic actuation by the impact/rollover device in the aid devices so equipped), of the red dome light directly to the 12 V power source at fuse 60. In this manner, the red dome light gives off a steady glow indicating to passing individuals that the stranded vehicle/person is equipped with a communications system. Alternatively, a passing individual can use the steady glow to indicate that the passing vehicle/person is equipped with additional communications systems.

While the present invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. A visual and auditory signal sending system, comprising:
   green light signal sending means for producing a visual pulse of green light upon actuation thereof;
   amber light signal sending means for producing a visual pulse of amber light upon actuation thereof;
   red light signal sending means for producing a visual pulse of red light upon actuation thereof;
   motion detecting means for detecting non-desired motion in a given plane or orientation including means for sending an electrical signal indicative of said non-desired motion;
   auditory signal sending means for emitting an audible pulse of sound upon actuation thereof;
   manually operable first switching means electrically connected to each of said green, amber, and red light signal sending means for initiating preset signalling sequences of said lights;
   automatic second switching means electrically connected to said motion detecting means, said red light signal sending means, and said auditory signal sending means, for initiating a preset signalling sequence of said red light and auditory signal sending means upon actuation of said second switching means by said electrical signal from motion detecting means.

2. A visual and auditory signal sending system as in claim 1, wherein:
   said motion detecting means comprises a pair of mercury switches connected in series with said red light and auditory signal sending means, said mercury switches being oriented so that when the mercury switches are tipped or inverted, the auditory and red light signal sending means are actuated.

3. A visual and auditory signal sending system as in claim 2, wherein:
   said motion detecting means further comprises a pendulum mounted to a surface for forward and aft movement with respect to a pair of toggle switches, said toggle switches being actuated when said pendulum has travelled through an arc in response to sudden movement of said pendulum mounting surface, said toggle switches connecting said red light and auditory signal sending means for actuation when said toggle switches are actuated by said pendulum.

4. A visual and auditory signal sending system as in claim 1, further comprising:
   a casing for surrounding and mounting said signal sending and switching means of said signal sending system, said casing including top, bottom, front, back, left, and right panels, said back panel having said manually operable first switching means mounted thereon.

5. A visual and auditory signal sending system as in claim 1, further comprising:
   forward and aft switching means for selectively activating said green and amber signal sending means to emit pulses of light in a selected direction.

6. A visual and auditory signal sending system as in claim 1, further comprising:
   third switching means for selectively actuating said red light signal sending means in parallel with either of said green and amber signal sending means or independently of said green and amber signal sending means.

7. A visual and auditory signal sending system as in claim 6, further comprising:
   control panel means for mounting said third and manually operable switching means remotely from said green, amber, red, and auditory signal sending means.

8. A visual and auditory signal sending system as in claim 7, further comprising:
   forward and aft switching means for selectively activating said green and amber signal sending means to emit pulses of light in a selected direction;
   said forward and aft switching means being mounted on said control panel means.

9. A visual and auditory signal sending system as in claim 6, wherein:
   said red light signal sending means comprises a double filament bulb having first and second filaments, said first filament being connected for selective actuation by said third switching means, said second filament being connected for automatic actuation by said automatic second switching means.

10. A visual signal sending system, comprising:
    green light signal sending means for producing a visual pulse of green light upon actuation thereof;
    amber light signal sending means for producing a visual pulse of amber light upon actuation thereof;
    red light signal sending means for producing a visual pulse of red light upon actuation thereof;
    manually operable first switching means electrically connected to each of said green, amber, and red light signal sending means for initiating preset signalling sequences of said lights;
    second switching means for selectively actuating said red light signal sending means in parallel with either of said green and amber signal sending means or independently of said green and amber signal sending means; and,
    forward and aft switching means for selectively directing the visual signal of said amber and green signal sending means in a desired direction.

11. A visual signal sending system as in claim 10, wherein:
    said red signal sending means comprises a double filament bulb having first and second filaments, said first filament being connected for parallel actuation with said green and amber light signal sending means, said second filament being connected for actuation independent of said amber and green signal sending means.

12. A visual signal sending system as in claim 10, further comprising:

motion detecting automatic switching means for actuating emergency signalling of said red light signal sending means when non-desired motion is detected.

13. A visual signal sending system as in claim 12, wherein:

said motion detecting automatic switching means comprises a mercury switch.

* * * * *